No. 862,883. PATENTED AUG. 13, 1907.
F. V. CONLEY.
ADJUSTABLE STANDARD FOR CAMERA LENSES.
APPLICATION FILED APR. 17, 1906.

2 SHEETS—SHEET 1.

WITNESSES: Fredrick V. Conley, INVENTOR.
By C. A. Snow & Co.
ATTORNEYS

THE NORRIS PETERS CO., WASHINGTON, D. C.

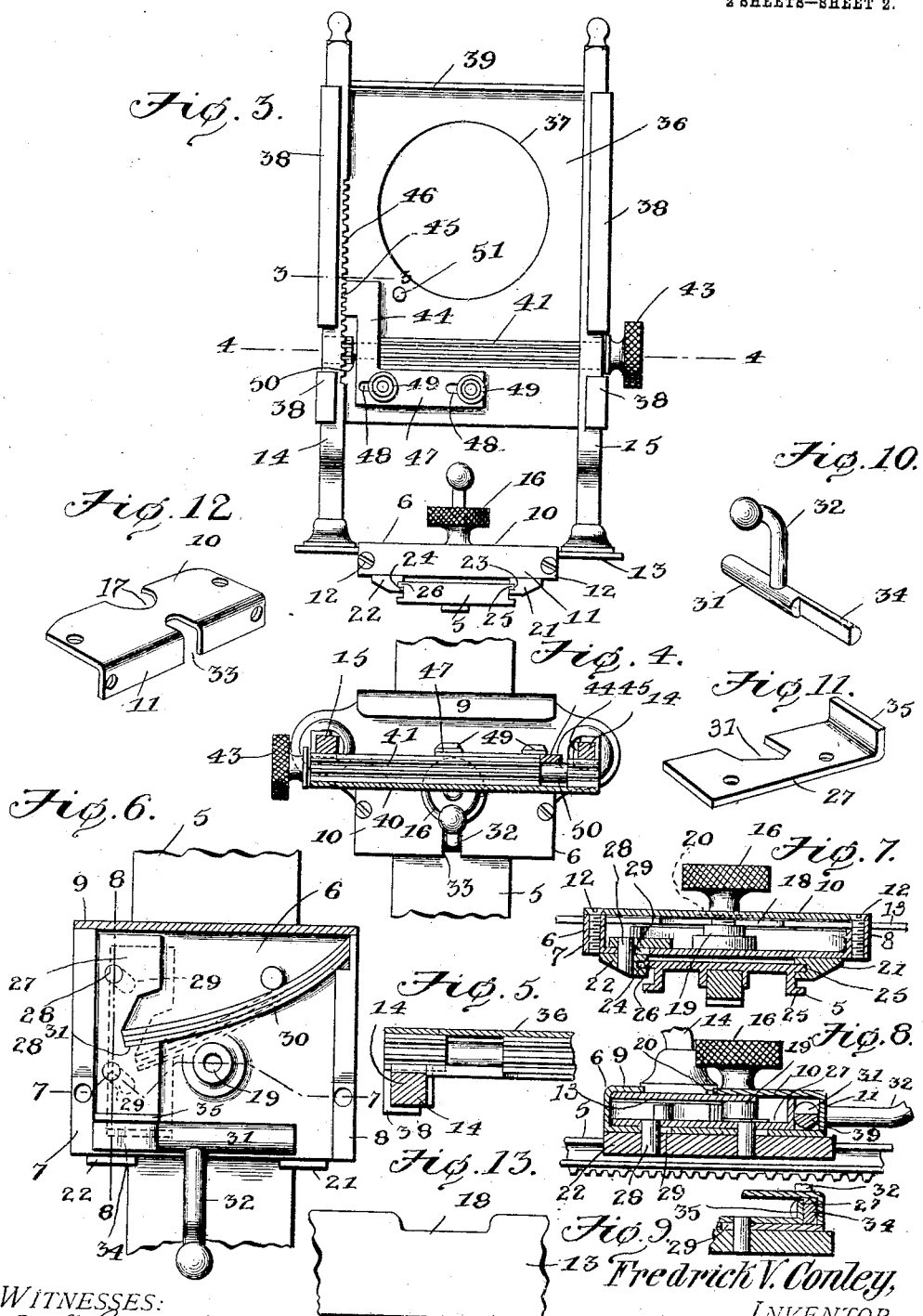

UNITED STATES PATENT OFFICE.

FREDRICK VICTOR CONLEY, OF ROCHESTER, MINNESOTA.

ADJUSTABLE STANDARD FOR CAMERA-LENSES.

No. 862,883.  Specification of Letters Patent.  Patented Aug. 13, 1907.

Application filed April 17, 1906. Serial No. 312,244.

*To all whom it may concern:*

Be it known that I, FREDRICK VICTOR CONLEY, a citizen of the United States, residing at Rochester, in the county of Olmsted and State of Minnesota, have invented a new and useful Adjustable Standard for Camera-Lenses, of which the following is a specification.

This invention relates to lens carriages for bellows cameras, and has for its object to provide certain new and useful improvements in the means for adjustably clamping the carriage upon the runway, and also to enable the convenient vertical adjustment of the carriage.

With these objects in view, the present invention consists in the combination and arrangement of parts as will be hereinafter more fully described, shown in the accompanying drawings and particularly pointed out in the appended claims, it being understood that changes in the form, proportion, size and minor details may be made, within the scope of the claims without departing from the spirit or sacrificing any of the advantages of the invention.

Figure 1:
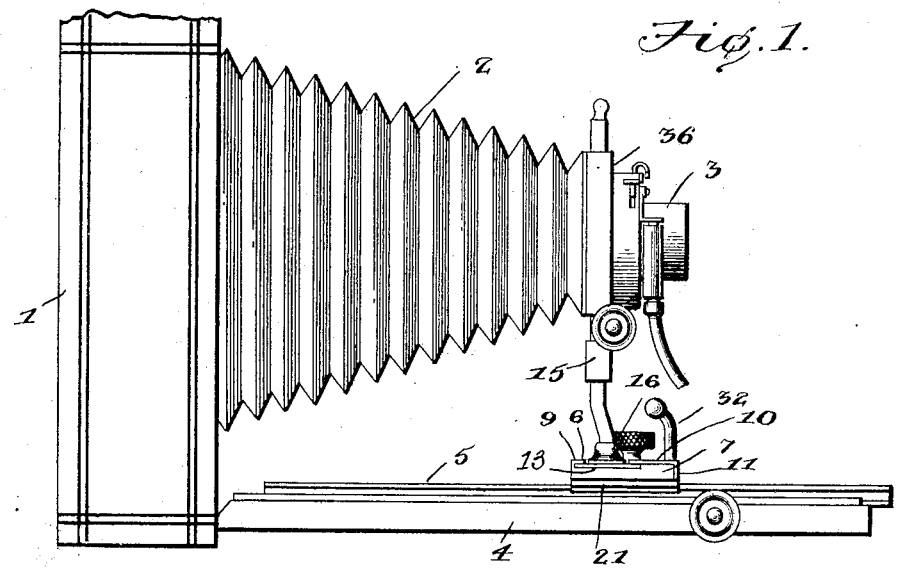
Figure 2:
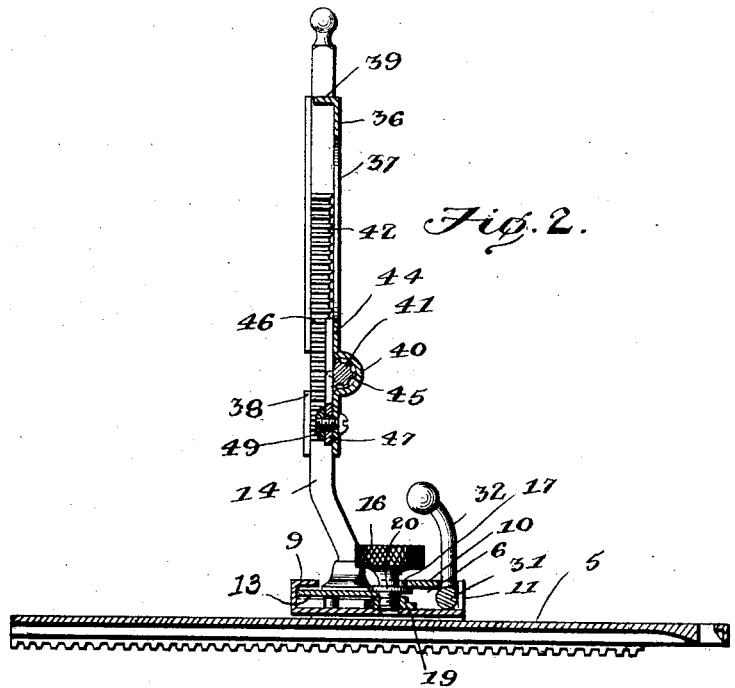

In the drawings: Figure 1 is a side elevation of a bellows camera equipped with the device of the present invention. Fig. 2 is an enlarged vertical sectional view taken centrally through the carriage and the runway or guideway therefor. Fig. 3 is a rear elevation of Fig. 2. Fig. 4 is a plan section upon the line 4—4 of Fig. 3. Fig. 5 is a fragmentary sectional view on the line 3—3 of Fig. 3. Fig. 6 is a plan view of the bed of the carriage with the top plate removed. Fig. 7 is a cross sectional view on the line 7—7 of Fig. 6. Fig. 8 is a sectional view on the line 8—8 of Fig. 7. Fig. 9 is a detail fragmentary sectional view illustrating the normal position of the cam for actuating the clamp which holds the bed of the carriage upon the guideway. Fig. 10 is a detail perspective view of the handled cam. Fig. 11 is a detail perspective view of the slide which is controlled by the cam. Fig. 12 is a detail perspective view of the top plate for the bed. Fig. 13 is a fragmentary view of the base plate which connects the standards of the carriage.

Like characters of reference designate corresponding parts in all of the figures of the drawings.

For illustrating the application and operation of the present invention, there have been shown in Fig. 1 of the drawings, a conventional form of camera including a camera box 1 having the usual bellows 2, a lens tube 3 connected therewith, and the bed 4 hinged to the front of the camera and carrying the usual endwise adjustable runway 5.

In carrying out the present invention, there is provided a carriage bed 6 in the nature of a rectangular metallic plate slidable upon and exceeding the width of the runway 5 and provided at opposite ends with upstanding flanges 7 and 8 which are cut away or reduced in height throughout their rear portion. The back edge of the bed has a forwardly directed flange or lip 9 overhanging the reduced portions of the flanges 7 and 8. The front portion of the bed is covered by a top plate 10 having a depending flange 11 closing the front end of the bed, said plate being connected to the flanges 7 and 8 by threaded fastenings 12. The top plate 10 is of a width to project slightly over the reduced rear portions of the flanges 7 and 8, whereby an open ended guideway is formed between the plate 10 and the overhanging flange 9 for the reception of the base plate 13 which connects the lower ends of the standards 14 and 15.

For the purpose of clamping the base plate 13 upon the bed in any adjusted position, there is a clamping screw 16 which works through an opening 17 in the back edge of the top plate 10, is received within a longitudinal slot or recess 18 in the front portion of the base plate 13, and has its threaded stem received within a threaded socket in a boss 19 provided upon the upper side of the bed plate 6. When the clamping screw is set downwardly, it passes through the opening 17 in the top plate 10 and its annular shoulder 20 bears against the top of the base plate 13 and thereby clamps the latter against endwise play upon the base, whereby the standards may be shifted from left to right upon the bed plate and then rigidly fixed thereon when set to the desired position.

The bed is slidably associated with the runway 5 by means of longitudinally disposed guide members 21 and 22 upon the under side of the bed, and provided with open-ended grooves 23 and 24 in their inner sides and receiving the respective flanges 25 and 26 upon the opposite edges of the runway. The guide 21 is fixed, while the guide 22 is laterally adjustable so as to be moved away from the runway to permit adjustment of the bed longitudinally of the runway, and also capable of being forced into snug engagement with the runway to clamp the bed thereon when set to any desired position.

The means for controlling the movable guide 22 includes a slide 27 working upon the upper face of the bed and rigidly connected with the guide 22 by means of a pair of pins 28 working in obliquely disposed slots 29 formed in the bed plate. A strong leaf spring 30 has one end secured in any suitable manner to the top of the bed plate with its free end suitably assembled with the slide, for instance, by being received within a recess 31, said spring being located in rear of the threaded seat or recess 19 and normally forcing the slide forwardly, which is thereby also moved inwardly under the influence of the pins 28 working in the oblique slots 29, whereby the movable guide 22 will be clamped against the runway 5 with sufficient force to lock the bed against movement upon the runway.

In order that the movable guide or clamp member 22 may be released from the runway, there is provided a handled cam consisting of a substantially cylindrical rack bar 31 mounted transversely across the front of the bed beneath the top plate and provided with a crank handle 32 located about midway of its ends and working in a slot or bifurcation 33 in the front of the top plate 10. When the handle is in an upright position, as in Figs. 2 and 9, the flat face of the reduced extremity 34 of the cam member 31 lies against the front end of the slide, said front end preferably having an upstanding flange or shoulder 35 to afford a broad bearing for the cam. When the handle is swung outwardly and downwardly, as illustrated in Figs. 6 and 8, the rounded portion of the cam working against the front end of the slide forces the latter rearwardly against the tension of the spring 30, the slide also being moved outwardly under the guiding influence of the pins 28 working in the oblique slots 29, whereby the clamp member 22 will be moved out of engagement with the runway, and the bed will thereby be freed from the runway and may be moved thereon to any desired position. When the handle is swung upwardly, the spring 30 will force the slide back into its normal position and thus the clamp 22 will be returned into engagement with the runway and the bed will thus be clamped upon the runway to prevent accidental shifting thereof.

In connection with the means for clamping the bed upon the runway, it will be noted that with the exception of the handle, all parts are housed within the bed and therefore not liable to become displaced, and the clamp can be very conveniently controlled merely by moving the handle in one direction to release the clamp and in the opposite direction to tighten the clamp upon the runway. Furthermore, it does not require a complicated manipulation of the handle, and it is necessary merely to throw the latter first to one limit and then to the other limit.

The lens carrier 36 consists of a metal plate having a circular opening 37 for the reception of a lens tube, the upright edges of the plate being bent around the standards to form flanges 38 slidably embracing the standards. The plate is stiffened throughout its upper portion by having its upper end bent to form a horizontal flange 39 lying between the standards. Adjacent the lower end of the plate, the latter is bent outwardly to form a substantially semi-tubular open ended bearing sheath 40 in which is a shaft or rotatable bar 41 having toothed portions for engagement with the racks or toothed front portions 42 of the standards. One end of this shaft is provided with a finger piece or handle 43 for convenience in rotating the shaft to raise and lower the lens carrier 36 upon the standards.

To lock the lens carrier at one elevation, there is provided an upstanding latch 44 having a toothed head 45 for engagement with a rack or set of teeth 46 upon the inner face of one of the standards. This latch is provided at its lower end with a substantially horizontal tail piece 47 provided with a pair of longitudinal slots 48 receiving headed fastenings 49, whereby the latch is slidably connected with the lens carrier. The shaft 41 projects rearwardly through the open side of the sheath or case 40 and is provided with an annular groove 50 receiving the shank portion of the latch. The shaft is slidable endwise and when drawn outwardly, one of the sides of the groove engages the latch and moves the same out of engagement with the adjacent standard, whereby the lens carrier 36 is free to be raised and lowered by manipulation of the finger piece 43. Upon forcing the shaft inward, the other side of the groove engages the latch and forces the same into engagement with the standard, whereby the carrier is locked in any set position. To limit outward play of the shaft, there is a stop shoulder 51 provided upon the rear side of the lens carrier 36 and in the path of the latch.

Having thus described the invention, what is claimed is:

1. A lens carriage having a bed, fixed and movable guide members carried by the under side of the bed for engagement with a runway, a slide mounted upon the top of the bed and connected with the movable guide through a slot in the bed, a spring carried by the bed and associated with the slide to maintain the movable guide at its inner limit, and a handled cam mounted upon the bed and associated with the slide for moving the latter against the tension of the spring.

2. A lens carriage having a bed, fixed and movable guide members carried by the under side of the bed for engaging a runway, the bed having a pair of oblique slots, a slide upon the top of the bed over the slots, pins connecting the slide and the movable guide through the slots, a spring engaging the slide and normally holding the same at its inner limit, and a cam associated with the slide for moving the same against the tension of the spring.

3. A lens carriage having a bed, fixed and movable guides upon the under side of the bed for engagement with a runway, the bed being provided with an oblique slot above the movable guide, a slide upon the top of the bed across the slot, a pin connecting the slide and the movable guide through the slot, a spring engaging the slide and holding the same at its forward limit, a rack bar mounted upon the bed with one end formed into a cam associated with the front end of the slide, and a handle for the rack bar.

4. A lens carriage having a bed, fixed and movable guides upon the under side of the bed, a slide upon the top of the bed, the bed having an oblique slot, a pin connecting the slide and the movable guide through the slot, a top plate for the top of the bed, a spring maintaining the slide at one limit, a cam mounted beneath the top plate and associated with the slide, and a handle carried by the cam and rising through the slot in the top plate.

In testimony that I claim the foregoing as my own, I have hereto affixed my signature in the presence of two witnesses.

FREDRICK VICTOR CONLEY.

Witnesses:
A. C. GOODING,
JOHN HALL.